(No Model.) 2 Sheets—Sheet 1.
E. E. BAWSEL.
POLE CHANGER FOR TELEPHONE CALL CIRCUITS.
No. 274,552. Patented Mar. 27, 1883.
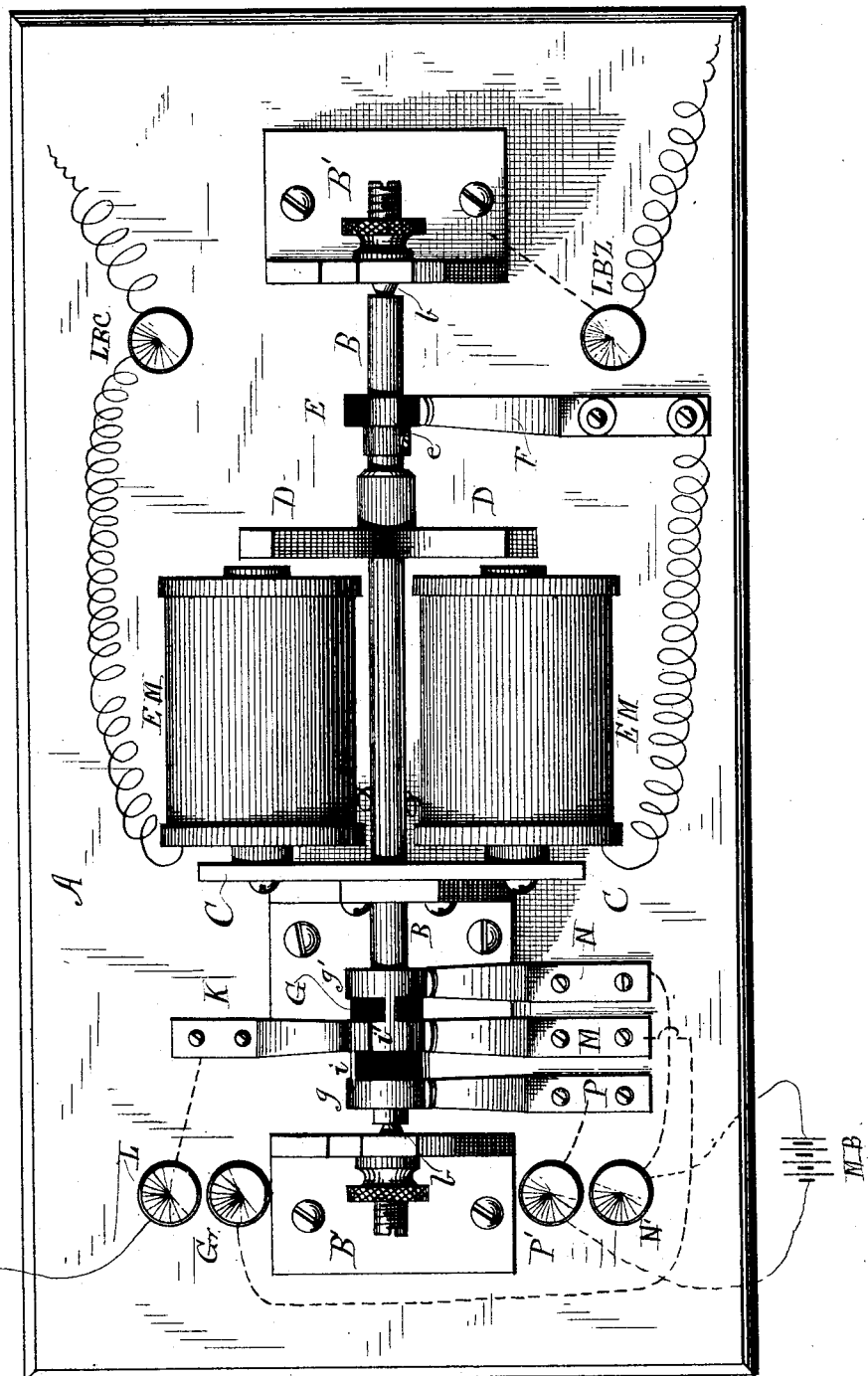

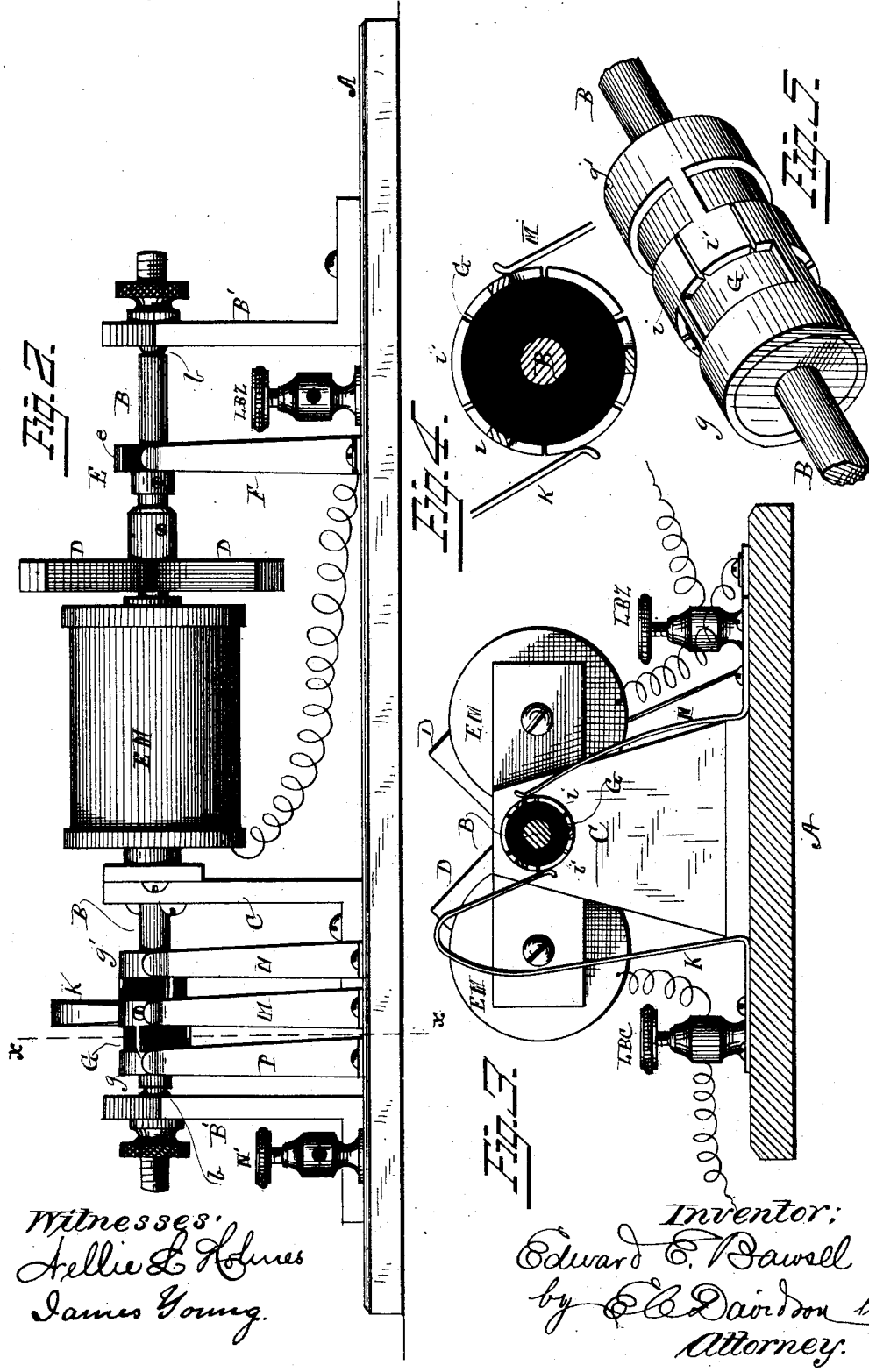

UNITED STATES PATENT OFFICE.

EDWARD E. BAWSEL, OF WASHINGTON, DISTRICT OF COLUMBIA, ASSIGNOR TO WARREN CHOATE, OF SAME PLACE.

POLE-CHANGER FOR TELEPHONE CALL-CIRCUITS.

SPECIFICATION forming part of Letters Patent No. 274,552, dated March 27, 1883.

Application filed November 9, 1882. (No model.)

*To all whom it may concern:*

Be it known that I, EDWARD EVERETT BAWSEL, of Washington city, District of Columbia, have invented certain new and useful Improvements in Pole-Changers for Telephone Call-Circuits, of which the following is a specification.

The improved pole-changer has a continuously-revolving shaft with contacts thereon, which make contact with fingers or springs properly connected to battery and to line, so that whenever the circuit is completed reverse currents are thrown upon the line in rapid succession and ring the bell or bells in the circuit, as is well understood. By employing a continuously-revolving shaft run at a suitable speed, the apparatus is noiseless, operates with regularity and efficiency, and requires a very small power to drive it. The shaft is continuously driven by a small electro-magnetic motor mounted on the same base-plate and forming part of the same apparatus, the armature of the motor being carried by the pole-changing shaft. Two or three cells will be found sufficient to drive the shaft with uniformity at a suitable speed. The advantages of such an arrangement over any kind of clock-work or mechanical motor are, its economy, the ease and noiselessness with which it runs, the fact that the motor does not always require winding or some other operation to keep it ready to start or working; and 1 have found that a pole-changer thus constructed so as to give a gliding contact does not produce disturbing inductive effects on the adjacent lines, as is the case with mechanical and vibratory instruments.

In the accompanying drawings, Figure 1 is a plan view of the instrument; Fig. 2, a side elevation; Fig. 3, a transverse section on the line *x x;* Fig. 4, an enlarged sectional view of the continuously-revolving shaft and its contact-plates, also on the line *x x;* and Fig. 5 is a detail perspective view of that portion of the shaft carrying the battery-reversing contact-plates.

A is a wooden, vulcanite, or other suitable bed-plate, on which the apparatus is mounted. The continuously-rotating shaft B rotates on two screw-point bearings, *b b*, mounted in brackets B' on the bed-plate, and which may be adjusted as desired. The two coils and cores of the electro-magnet E M are arranged parallel to the shaft, and are supported by a bracket, C, through an opening in which the shaft B passes without contact. Just in front of the poles of the electro-magnet two soft-iron cross-bars, D, are secured on the shaft at right angles to each other. A make and break wheel or disk, E, is also mounted on the shaft, its conducting-faces *c* being in electrical connection with the shaft. A contact-finger, F, mounted on the bed-plate bears against the face of this wheel. The circuit of the local battery which operates this motor is as follows: from L B Z to bracket B', shaft B, conducting-faces of wheel E, contact-finger F, through coils of magnet to the opposite pole of the battery L B C. The connections with the local battery being complete, when an impulse of rotation is imparted to the shaft B, it will be continuously driven by the action of the electro-magnet after the manner of an ordinary motor, as is well understood. An ebonite, vulcanite, or suitable insulating drum or hub, G, is placed on the shaft at one end, and on this hub the battery-reversing contacts are placed. These contacts consist of two annular metallic rings, *g g'*, placed around each end of the hub. From these rings T-shaped contacts or plates *i i'* project inwardly alternately, first from one of the rings *g g'* and then from the other, the stems of the T-pieces being arranged parallel with the axis of the shaft, and their tops in line with each other around the shaft, but not in contact, so as to form a broken ring around the hub G. A contact-finger, K, on one side bears against the broken ring *i i'*, and is electrically connected with a binding-post, L, with which the open telephone call-circuit is connected. A like finger, M, also bearing on this broken ring, is connected with the ground-post *r* G. A contact-finger, P, bears upon the ring *g*, and is connected with the positive pole P' of the battery, while a finger, N, bearing upon the ring *g'*, is connected with the negative pole N' of the battery M B. As the shaft B rotates, the opposite poles of the battery will be alternately thrown on the line in rapid succession. Thus, when the finger K is bearing upon one of the T-pieces *i*, connected with the ring *g*, the positive pole of the battery will be connected with the line through finger P, ring $g$, contact $i$, and finger K, and at the same time the negative pole will be put to ground through finger N, ring $g'$, contact $i'$, and finger M. A further movement of the shaft serves, as will be plain, to reverse the relations of the parts relatively to the poles of the battery, and so on in rapid succession, throwing the opposite poles alternately to line. The shaft B being continuously rotated in the manner described and the opposite poles of the calling-battery thrown to line alternately, the call-bell in any circuit may be rung by completing the circuit from the pole-changer over that line, as is well understood.

I have said at the beginning of this specification that a pole-changer of this character—that is, one with gliding contact—caused less disturbing inductive effect in the telephonic circuits. There is another peculiarity of the organization I have shown which consists in the accomplishment of the same result. It will be noted that the fingers K and M have quite a large surface of contact with the broken central ring, $i\ i'$, and that they both bridge a break in the ring at the same time, thus maintaining contact with both surfaces and connection with both poles of the battery. The poles of the battery are therefore always electrically connected, no actual break ever occurring, and at the moment when each of the fingers K M is bridging a break in the ring $i\ i'$ the poles are connected by the two circuits. As the fingers pass from the contacts $i$ to those $i'$ the reversal of the polarity of the current is accomplished by a comparatively gradual lessening of the current in one circuit and a proportionate increase in the other, the connection between the battery-poles never being interrupted.

I make no claim to the feature of placing a pole-changer in the open calling-circuit of a telephone system, such subject-matter not being new with me, but limit myself to the matter hereinafter specifically claimed.

I claim as my invention—

The combination, substantially as set forth, of a telephonic call-circuit, a call-battery placed therein, the electric motor, its local circuit, the continuously-revolving battery-reversing shaft which carries and revolves with the rotary moving armature of the electric motor, the line and battery connections, the contact-fingers, and the battery-reversing contacts $i\ i'$, arranged on the rotating shaft with reference to the contact-fingers, as described, and moving in gliding contact with said fingers.

In testimony whereof I have hereunto subscribed my name.

EDWARD EVERETT BAWSEL.

Witnesses:
NELLIE HOLMES,
E. C. DAVIDSON.